United States Patent [19]

Patt et al.

[11] Patent Number: 5,399,495
[45] Date of Patent: Mar. 21, 1995

[54] MICROBIAL DEGRADATION OF CHEMICAL POLLUTANTS

[75] Inventors: Tom E. Patt; Haile M. Abebe, both of Kalamazoo, Mich.

[73] Assignee: The Upjohn Company, Kalamazoo, Mich.

[21] Appl. No.: 55,059

[22] Filed: Apr. 28, 1993

[51] Int. Cl.⁶ .......................... C12N 1/14; C12N 1/16
[52] U.S. Cl. ............... 435/254.1; 435/262.5; 435/911
[58] Field of Search .................. 435/262.5, 254.1, 911

[56] References Cited

U.S. PATENT DOCUMENTS

| | | | |
|---|---|---|---|
| 3,769,164 | 10/1973 | Azarowicz | 435/262.5 |
| 4,420,397 | 12/1983 | Kaneko et al. | 210/611 |
| 4,505,821 | 3/1985 | Kaneko et al. | 435/254 |
| 4,863,872 | 9/1989 | Wolfram et al. | 435/253.3 |
| 4,983,618 | 1/1991 | Pulido et al. | 514/367 |
| 5,036,012 | 7/1991 | Wolfram | 435/262 |

FOREIGN PATENT DOCUMENTS

| | | |
|---|---|---|
| 59046194 | 9/1982 | Japan . |
| 62104573 | 10/1985 | Japan . |
| 1375646 | 2/1988 | U.S.S.R. . |
| 1652335 | 6/1988 | U.S.S.R. . |

OTHER PUBLICATIONS

Appl. Microbiol. Biotechnol., "Degradation of Dioxane, Tetrahydrofuran and Other Cyclic Ethers by an Environmental Rhodococcus Strain", 36, pp. 120–123 (1991).

Khimiya I. Tekhnologiya Vody, "Selection of Destructor Microorganisms for Heterocyclic Xenobiotics", 9, No. 5, pp. 442–445 (1987).

Fourth Annual Report on Carcinogens (NTP 81-43:1-31-133, Dec. 1985).

Primary Examiner—Douglas W. Robinson
Assistant Examiner—L. Blaine Lankford
Attorney, Agent, or Firm—Bruce Stein

[57] ABSTRACT

Disclosed is a biologically pure culture of *Aureobasidium pullmans* deposited as NRRL 21064. Further disclosed are processes for decreasing the concentration of a type A/B chemical pollutants in an aqueous mixture containing the type A/B chemical pollutant which comprises adding sufficient amount of a fungal cyclic ether degrading microorganism to the aqueous mixture containing the chemical pollutant in the presence of a sufficient amount of cometabolite (type A chemical pollutant; not needed with type B) and a sufficient amount of oxygen.

1 Claim, No Drawings

MICROBIAL DEGRADATION OF CHEMICAL POLLUTANTS

BACKGROUND OF THE INVENTION

1. Field of the Invention

The invention involves the use of a novel microorganism which degrades certain chemical pollutants to non-pollutants under certain appropriate circumstances.

2. Description of the Related Art

U.S. Pat. Nos. 4,863,872 and 5,036,012 disclose a species of the bacterium Pseudomonas (NRRL-B18435) and a process for degrading the toxic organic solvents contained in liquid scintillation fluid in a special apparatus for the biodegradation. These toxic solvents included benzene, toluene, xylene, pseudocumene (1,2,4-trimethylbenzene), dioxane and cyclohexane. The concentration of toxic organic solvents present were from 50–90%. The Pseudomonas culture was capable of degrading the organic solvents when present in concentrations as high as 10,000 ppm. The process of the present invention does not require the use of a special equipment, but rather degrades the chemical pollutants where certain conditions can be met where the pollution occurs.

Appl. Microbiol. Biotechnol., 36, 120 (1991) discloses that a bacterial culture, Rhodococcus, is capable of degradation of dioxane, tetrahydrofuran and other cyclic ethers. However, only limited growth and degradation took place on these cyclic ether substrates.

Russian patent 1,375,646 discloses a bacterium, Xanthomonas, which will degrade THF in drainage water.

Khimiya I Tekhnologiva Vody, 9, 442 (1987) discloses a bacterial culture which grows on a solid medium and which degrade dioxane and THF. However, these cultures are not operable in liquid medium.

The Environmental Protection Agency has listed dioxane as a possible carcinogen in its Fourth Annual Report on Carcinogens (NTP 81-43:131-133, December 1985). Chemical compounds need not be carcinogenic to be considered to be polluting the environment. From time to time dioxane and/or other undesirable chemical pollutants enter the environment. Some of these enter the atmosphere as in Bophal, India while others enter the oceans as the well known oil spill in Valdez, Ak. However, more common are the various industrial chemicals which enter the ground water, streams and lakes as discharge from the many thousands of plants which discharge aqueous waste containing various amounts of toxic chemical pollutants. In the famous case of Diamond v Chakrabarty the claimed microorganism was useful for degrading oil from oil spills. It would be highly desirable to have microorganisms which would degrade other types of toxic chemical pollutants. The present invention involves a microorganism and process for degrading certain toxic chemical pollutants where the pollution occurs.

Non-bacterial fungal microorganisms are known which degrade a variety of environmental pollutants. Russian Patent 1,652,335 discloses a new strain of Streptomyces rochei which will degrade chlofinated phenols and use them for the carbon source. Japanese Patent 62,104,573 discloses removal of tetraalkyl ammonium salts and/or methylated mines from waste water using Nocardia. U.S. Pat. No. 4,505,821 discloses removing phenol and formaldehyde from waste water by treatment with Trichosporon. Japanese Patent 59,046,194 discloses decolofizing lignin sulphonate containing liquid using Penicillium.

The present invention involves the novel non-bacterial microorganism Aureobasidium pullulans identified as NRRL 21064 which by growing to great cell densities efficiently degrades some toxic chemical pollutants in nature where the pollution occurs including at relatively low pH.

SUMMARY OF INVENTION

Disclosed is a biologically pure culture of Aureobasidium pullulans deposited as NRRL 21064.

Further disclosed is a process for decreasing the concentration of a type A chemical pollutant in an aqueous mixture containing the type A chemical pollutant which comprises adding sufficient amount of a fungal cyclic ether degrading microorganism to the aqueous mixture containing the chemical pollutant in the presence of a sufficient amount of cometabolite and a sufficient amount of oxygen.

Also disclosed is a process for decreasing the concentration of a type B chemical pollutant in an aqueous mixture containing the type B chemical pollutant which comprises adding sufficient amount of a fungal cyclic ether degrading microorganism to the aqueous mixture containing the chemical pollutant in the presence of a sufficient amount of oxygen.

DETAILED DESCRIPTION OF THE INVENTION

The present invention is a novel microorganism, Aureobasidium pullulans (NRRL 21064) and two process for decreasing the concentration of chemical pollutants in nature where the chemical pollutants are present in a concentration of less than about 10%. In the first of these processes a cometabolite is required, in the second process a cometabolite is not required. The processes are fermentation-type processes which take place in the environment where chemical pollutants are to be degraded. Usually fermentation processes are used for production of compounds (antibiotics) or modification of compounds (11$\beta$-hydroxylation or $\Delta^1$-dehydrogenation of steroids) whereas in the present invention the fermentation is to degrade a substrate and reduce its concentration in the aqueous environment since the substrate of the fermentation is a chemical pollutant.

A fungal cyclic ether degrading microorganism refers to a fungus which degrades or metabolizes a cyclic ether selected from the group consisting of dioxane and THF when placed in an environment of 5–10 mg/l of the cyclic ether under appropriate conditions as is known to those skilled in the fermentation art, it decreases the concentration of the cyclic ether significantly, by about 10% in 7 days. The preferred fungal cyclic ether degrading microorganism is Aureobasidium pullulans; it is more preferred that the Aureobasidium pullulans be the culture identified by Northern Regional Research Laboratories as NRRL 21064 and which is available to the public from NRRL. One skilled in the art would know how to care for, maintain and use the culture Aureobasidium pullulans. There is nothing special about the care and maintenance of this culture.

Description of the Culture

Growth on Sabouraud dextrose agar first black then becoming olive brown with age. The texture is velutinous and reverse of culture is black.

Growth on corn meal agar with Tween 80 is dark brown to black, pasty and yeast like, reverse of culture is black.

Growth on potato dextrose agar is dark brown to black, becoming velvety in texture with age, reverse of culture is black.

The culture grows in seven days at 37°.

The conidia measure 2.5 to 7.5 νm in length under 500× magnification. They are one-celled, hyaline, round to ellipsoid, synchronous and continue to multiply by budding. There are no distinct conidiophores present. The conidia arise directly from the walls at certain fertile points. Endoconidia are present.

Since the culture looked like a black yeast and microscopic examination revealed budding cells, Phaecocomyces sp. was an initial possibility. However, Phaecocornyces does not produce hyphae. Subculturing the isolate to the various media reveals the presence of true hyphae. According to the Laboratory Handbook of Medical Mycology by Michael R. McGinnis, Academic Press, New York, p 661, a brown to black colony with yeast and hyphae is possibly a member of Aureobasidium sp., Exophiala sp. or Wangiella sp. When cultured on the various media, *Aureobasidium pullmans* NRRL 21064 resembled the Exophiala sp. but microscopically the culture appears quite different from the Exophiala sp.

*Aureobasidium pullulans* NRRL 21064 has no conidiophore and the conidia form directly from the hyphae. Exophiala spp. produce an annellide structure from which conidia are produced. No annellide structures are observed with *Aureobasidium pullulans* NRRL 21064. Wangleila spp. take up to 25 days to grow and the novel microorganism grew to its fungus like state in one week. Wangiella spp. also produce a distinct conidia producing structure. The novel microorganism was tentatively identified as an Aureobasidium sp. by virtue of its colony and microscopic morphology which is black to olive brown colored colony with conidia that arise directly from the hyphae, with no distinct conidiophore. Following the key from Studies in *Stud. Mycol.*, 15, 141–77 (1977), the novel microorganism is *Aureobasidiurn pullulans,* vat. *melanigenum,* see CHART A.

Processes of the Invention

The processes of the present invention include a process for decreasing the concentration of a type A chemical pollutant in an aqueous mixture containing the type A chemical pollutant which comprises adding sufficient amount of a fungal cyclic ether degrading microorganism to the aqueous mixture containing the chemical pollutant in the presence of a sufficient amount of cometabolite and a sufficient amount of oxygen. The other process is identical, except that it decreases the concentration of type B chemical pollutants, and does not require a cometabolite.

Type A chemical pollutants include dioxane, N-ethyl morpholine and tetrahydrofuryl chloride; it is preferred that the type A chemical pollutant be dioxane. Type B chemical pollutants include THF, tetrahydrofuryl alcohol, 3-hydroxytetrahydrofuran, 2,5-diethoxytetrahydrofuran, butyrolactone, dimethyltetrahydrofuran; it is preferred that the type B chemical pollutant be THF. These chemical pollutants can be present in small concentrations to quite large concentrations, for example with dioxane from about 0.05 mg/l to about 10%. Hence, the processes of the present invention can be used where the chemical pollution is quite minimal to where the chemical pollutant has contaminated an aqueous environment to the extent of about 10%.

Further, the processes of the present invention can be utilized where the surface water polluted is a fairly small volume, like a pond to large bodies of water such as lakes. When the chemical pollutant is in ground water, the water can first be pumped to the surface and then added to a pond or reactor vessel for biodegradation by the processes of the present invention or alternative the fungal cyclic ether degrading microorganism can be injected into the area of contamination.

When cometabolites are required, operable cometabolites include THF and ethanol; it is preferred that the cometabolite be THF. The process is useful both when the cometabolite itself is a chemical pollutant and found with the chemical pollutant in the aqueous mixture or when the cometabolite has to be added to the polluted mixture. The concentration of cometabolite will vary with the particular cometabolite and chemical pollutant as would be apparent to one skilled in the art. For the chemical pollutant dioxane, a cometabolite is THF. In this situation the operable concentration of THF is from about 1 mg/l to about 20 g/l.

The process of the present invention is operable in temperature ranges of about 5° to about 37°. If the temperature is less than about 5°, the processes of the present invention in essence stops. When the temperature warms, the process continues. If the temperature is greater than about 37°, then the cells of *Aureobasidium pullmans* die. As the temperature increases from about 5° to near 37°, the rate of biodegradation of the present invention increases, as is known to those skilled in the art.

It is necessary for the biodegradation of the chemical pollutant that the fungal cyclic ether degrading microorganism, preferably *Aureobasidiurn pullulans,* be present in at least about $10^5$ microorganisms/ml. It is preferable to have about $10^7$ to about $10^8$ microorganisms/ml, and even higher concentrations of microorganism are operable and the biodegradation rate increases, but one needs to concentrate the microorganism to reach higher numbers. It should be realized that the higher the concentration of microorganisms the faster the decrease in the concentration of the chemical pollutant. The above refers to nongrowth conditions where a sufficient quantity of the microorganism is placed in the contaminated water to decrease the concentration of undesired chemical pollutant. Alternatively, a small inoculum can be added and these microorganisms permitted to grow to a larger concentration. While growing the fungal cyclic ether degrading microorganism will concurrently be destroying the chemical pollutant. It should be realized by one skilled in the art that with pregrown cells there is virtually no mineral component requirement, certainly none need be added. However, with the small inoculum, sufficient mineral component is necessary for the microorganisms to grow. When a mineral component is required it is preferred that the nitrogen be present in the form of nitrates, amino acids, urea, ammonium salts, proteins and the mineral component phosphorous be present in the form of phosphate salts in sufficient quantities to give the desired cell concentration. The amount or concentration of the mineral components necessary at any one time will depend on whether the process is a batch type or continuous type as is known to those skilled in the art. When the process is a continuous type the mineral components should then be present for nitrogen at a concentration of at least about 0.1 g/l and for the mineral component phosphorous present in a concentration of at least about 0.05 g/l.

The process of the present invention can be practiced in either batch (lakes, ponds, reactors) or continuous mode (reactors, pond or lagoons with continuous stream, in situ ground water) as is known to those skilled in the art of fermentation chemistry.

The process of the present invention requires a sufficient amount of dissolved oxygen. The amount or concentration of oxygen that is present in most aqueous polluted environmental systems is sufficient for the processes of the present invention. If the concentration of dissolved oxygen is not sufficient, then additional oxygen must be added.

With regard to pH, being a fungus *Aureobasidium pullulans* has a broader operable range than bacterial cultures. With the exception of acid mine drainage, most all aqueous type A or type B chemical pollutants in the environment have a pH which is suitable for the processes of the present invention.

DEFINITIONS

The definitions and explanations below are for the terms as used throughout this entire document including both the specification and the claims.

All temperatures are in degrees Centigrade.

*Aureobasidium pullulans* refers to the culture identified by Northern Regional Research Laboratories as NRRL 21064.

Dioxane refers to 1,4-dioxane.

Cometabolite is a compound required to biodegrade type A chemical pollutants.

THF refers to tetrahydrofuran.

ppm refers to parts per million.

A fungai cyclic ether degrading microorganism refers to a fungus which degrades or metabolizes a cyclic ether selected from the group consisting of dioxane and THF when placed in an environment of 5-10 mg/l of the cyclic ether under appropriate conditions as is known to those skilled in the fermentation art, it decreases the concentration of the cyclic ether significantly, by about 10% in 7 days.

EXAMPLES

Without further elaboration, it is believed that one skilled in the art can, using the preceding description, practice the present invention to its fullest extent. The following detailed examples describe how to prepare the various compounds and/or perform the various processes of the invention and are to be construed as merely illustrative, and not limitations of the preceding disclosure in any way whatsoever. Those skilled in the art will promptly recognize appropriate variations from the procedures both as to reactants and as to reaction conditions and techniques.

EXAMPLE 1

Biodegradation of Dioxane Contaminated Ground Water

A 2,000,000 gallon aeration lagoon used for the treatment of waste streams and ground water is polluted with dioxane at a level of 8 mg/l (ppm). The concentration of dioxane leaving the lagoon in the effluent is the same as the dioxane concentration in the influent. Tetrahydrofuran is also discharged to the aeration lagoon at level of approximately 5 to 8 mg/l. The pH of the waste stream is adjusted to 4.5 to 8.5 prior to entering the aeration lagoon.

A 300 gallon volume of *Aureobasidium pullulans* NRRL 21064 grown on tetrahydrofuran is introduced into the lagoon. This inoculum contains approximately $1 \times 10^6$ cells per millimeter, therefore approximately $1.1 \times 10^{12}$ cells are added to the 2 million gallon lagoon. The dioxane concentration did not drop as rapidly as when much higher levels of cells were used. After approximately two months the level of dioxane was below the detection limit.

EXAMPLE 2

Biodegradation of Dioxane and Tetrahydrofuran in Ground Water in a Fluidized-Bed Reactor An aerated fluidized bed is inoculated with approximately $10^8$ cells of *Aureobasidium pullulans* NRRL 21064. The reactor is feed ground water contaminated with dioxane (8 mg/l) which is supplemented with tetrahydrofuran. The pH is not adjusted (pH is approximately 6 to 7). The retention time in the reactor is one hour. The THF level in the effluent is below the detection limit (0.5 mg/l). The dioxane concentration is reduced from 8 mg/l in the groundwater to 0-2 mg/l in the effluent.

EXAMPLE 3

Biodegradation of Tetrahydrofuran in Ground Water in a Fixed Film Reactor

An aerated reactor is inoculated with *Aureobasidium pullulans* NRRL 2 1064 and fed a medium containing 0.1 ml THF per liter of minimal salts medium, as is known to one skilled in the art of fermentation chemistry. When a thick film of *Aureobasidium pullulans* NRRL 21064 accumulates on the reactor walls a solution of waste water containing THF is introduced batchwise. The disappearance of the THF is monitored with time. The THF concentration drops to below the detection limit of 0.5 mg/l by the eighth day.

| CHART A Key to the species | |
|---|---|
| I. Conidia less than 22 μm long on average | ② |
| I. Conidia over 22 μm long on average | 15 |
| 2(I). Conidia straight or nearly straight | ③ |
| 2(I). Conidia curved (at least the majority) | 12 |
| 3(2). Stromata present (plant parasites) | 4 |
| 3(2). Stromata absent (parasites or saprophytes) | ⑨ |
| 4(3). Stromata consisting of rounded cells | 5 |
| 4(3). Stromata consisting of elongate cells | 7 |
| 5(4). Stromata lightly pigmented (on Acer) | *A. apocryptum* (44) |
| 5(4). Stromata hyaline | 6 |
| 6(5). Conidiogenous cells producing conidia at the apex only (on Aleurites) | *A. aleuritidis* (43) |
| 6(5). Conidiogenous cells producing conidia all over the apical | *A. dalgeri* (46) |

-continued
CHART A
Key to the species

| | | |
|---|---|---|
| | region, often also laterally (on Eucalyptus) | |
| 7(4). | Hyphae of stromata rather loose | 8 |
| 7(4). | Hyphae of stromata tightly interwoven (on Liliaceae) | A. microstictum (49) |
| 8(7). | Conidiogenous cells inflated, broadly ellipsoidal (on Prunus) | A. prunicola (51) |
| 8(7). | Conidiogenous cells as wide as the supporting hyphae, cylindrical, with rounded apex (on Ribes) | A. ribis (54 |
| 9(3). | Brown hyphae in old cultures thick-walled | ⑩ |
| 9(3). | Brown hyphae in old cultures thin-walled | A. microstictum (49) |
| 10(9). | Conidia 11–16 μm long; constrictions of chlamydospore chains inconspicuous (on Linum) | A. lini (48) |
| 10(9). | Conidia 9–11 μm long; constrictions of chlamydospore chains conspicuous | ⑪ |
| 11(10). | Cultures remaining pink, light brown or yellow for at least three weeks | A. pullulans var. pullulans (52) |
| 11(10). | Cultures rapidly becoming black or dark olivaceous-green | A. pullulans var. melanigenum ㊼ |

It is claimed:

1. A biologically pure culture of *Aureobasidium pullulans* NRRL 21064.

* * * * *